R. W. BAILEY.
FISHING HOOK.
APPLICATION FILED JUNE 4, 1921.
1,419,903.
Patented June 13, 1922.
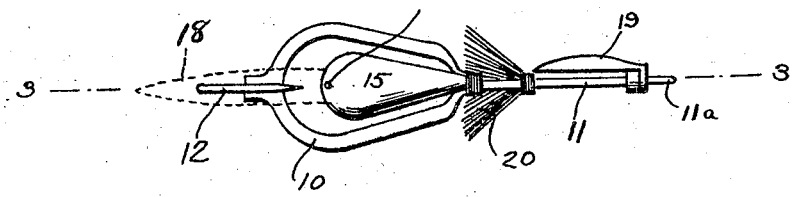
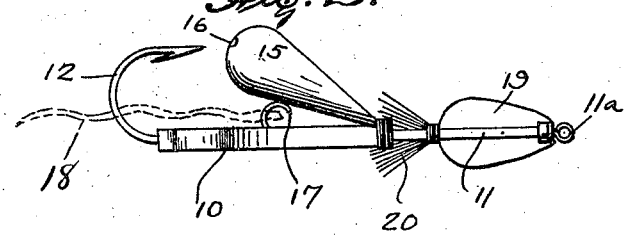
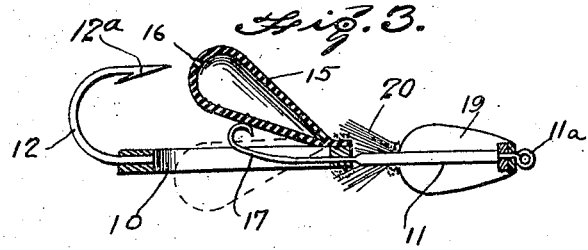
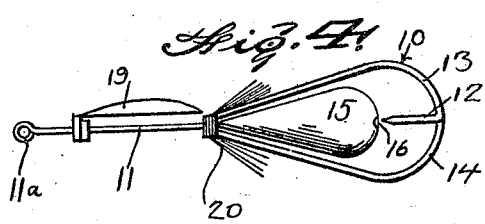 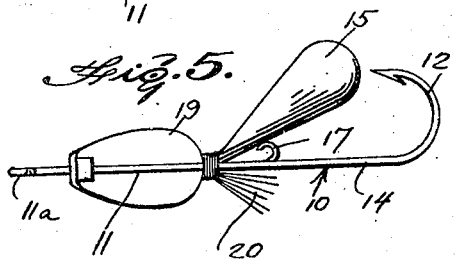
Inventor
R. W. Bailey
By Watson E. Coleman  Attorney

UNITED STATES PATENT OFFICE.

RAYMOND W. BAILEY, OF AKRON, OHIO.

FISHING HOOK.

1,419,903.  Specification of Letters Patent.  Patented June 13, 1922.

Application filed June 4, 1921. Serial No. 474,957.

*To all whom it may concern:*

Be it known that I, RAYMOND W. BAILEY, a citizen of the United States, residing at Akron, in the county of Summit and State of Ohio, have invented certain new and useful Improvements in Fishing Hooks, of which the following is a specification, reference being had to the accompanying drawings.

This invention relates to fishing hooks and has for an important object thereof the provision of a hook of the weedless type.

A further object of the invention is to provide a hook wherein the buoyancy of the hook may be altered as desired, so that the hook may be used for floating bait or submerged.

A further object of the invention is to provide a variably buoyant hook, the buoyant element of which serves to protect the hook proper from the engagement with weeds and grass.

A further object of the invention is to provide a hook of the above character wherein the buoyant element is so mounted that it moves out of the path of the hook when the same is struck, to enable the hook to engage properly.

Other objects and advantages of the invention will become apparent throughout the course of the following description.

In the accompanying drawings, wherein for the purpose of illustration are shown preferred embodiments of my invention and wherein like reference characters designate like parts throughout:

Figure 1 is a plan view of a hook constructed in accordance with my invention;

Figure 2 is a side elevation thereof;

Figure 3 is a section on the line 3—3 of Figure 1;

Figure 4 is a plan view of a slightly modified form of construction of my hook; and Figure 5 is a side elevation of the form of hook shown in Figure 4.

Referring now more particularly to the drawings, the numeral 10 indicates a yoke having an open center and having secured to one end thereof a shank 11, and to the opposite end a hook 12. In the form shown in Figures 1 to 3, the hook and shank are cast in the body of the yoke in the process of forming the same. In the form shown in Figures 4 and 5, a single piece of hook wire is employed for forming the shank hook and one side 13 of the yoke, the opposite side of the yoke being formed by a brace wire 14 of the same material.

Pivotally connected to the shank-attached end of the yoke is a bulb 15 which may be formed of rubber, aluminum or any suitable material, and which is provided with a filling opening 16 closed in any suitable manner. When it is desired to employ the hook as a floating lure, the bulb 15 is filled with air, and when it is desired to employ the hook as a submerged lure the bulb may be filled with water. To the shank-attached end of the yoke is likewise secured a pork-rind holder 17 for a pork-rind 18. This pork-rind holder is formed of spring metal and may normally tend to hold the bulb 15 in elevated position so that it lies in the path of the barb $12^a$ of the hook as the hook is being drawn through the water, effectually preventing the engagement of weeds and grass therewith. The guard 15 may, however, be connected to the shank by a spring or be constructed of rubber and have sufficient inherent resiliency to hold it in position. If of rubber, the gravity or levity may be controlled in the same manner as for aluminum or in any other suitable manner.

The shank 11 of the hook may be merely provided with a line attachment $11^a$, or may be additionally provided with the spinner 19 and the hackle-feather 20 intermediate the spinner and the yoke so as to provide an additional lure.

It will be obvious that the construction hereinbefore set forth is capable of many changes and modifications without departing from the spirit of my invention, and I accordingly do not limit myself to such specific structure except as hereinafter claimed.

What I claim is:—

1. In a device of the type described, a hook, a mounting therefor, a shiftable bulb connected to the mounting and adapted to contain a fluid, a yieldable bait-holding means normally holding said bulb in the path of said hook, the mounting of said bulb permitting shifting thereof out of the path of the hook when the hook is struck.

2. The combination with a fish hook, of common means for varying the buoyancy of the hook and for preventing engagement of weeds therewith, and means for normally maintaining the first named means in alinement with the hook, the last named means comprising a bait-holder.

In testimony whereof I hereunto affix my signature.

RAYMOND W. BAILEY.